United States Patent
Joo et al.

(10) Patent No.: US 12,321,068 B2
(45) Date of Patent: Jun. 3, 2025

(54) FILM WITH ELECTRICALLY CONTROLLABLE TRANSPARENCY AND METHOD FOR MANUFACTURING SAME

(71) Applicant: NANOBRICK CO., LTD., Pyeongtaek-si (KR)

(72) Inventors: Jae Hyun Joo, Pyeongtaek-si (KR); Seung Hun Han, Pyeongtaek-si (KR)

(73) Assignee: NANOBRICK CO., LTD., Pyeongtaek-si (KR)

( * ) Notice: Subject to any disclaimer, the term of this patent is extended or adjusted under 35 U.S.C. 154(b) by 0 days.

(21) Appl. No.: 18/288,530

(22) PCT Filed: Apr. 29, 2022

(86) PCT No.: PCT/KR2022/006200
§ 371 (c)(1),
(2) Date: Oct. 26, 2023

(87) PCT Pub. No.: WO2022/231387
PCT Pub. Date: Nov. 3, 2022

(65) Prior Publication Data
US 2024/0210769 A1    Jun. 27, 2024

(30) Foreign Application Priority Data

Apr. 29, 2021 (KR) .................. 10-2021-0055953
Jun. 4, 2021 (KR) .................. 10-2021-0072969

(51) Int. Cl.
G02F 1/1333    (2006.01)
G02F 1/1343    (2006.01)
G02F 1/1334    (2006.01)

(52) U.S. Cl.
CPC .... *G02F 1/13439* (2013.01); *G02F 1/133345* (2013.01); *G02F 1/133348* (2013.01); *G02F 1/1334* (2013.01)

(58) Field of Classification Search
CPC .... G02F 1/13; G02F 1/1333; G02F 1/133345; G02F 1/133348; G02F 1/1334;
(Continued)

(56) References Cited

U.S. PATENT DOCUMENTS 8,331,012 B2   12/2012   Kim et al.
8,654,071 B2   2/2014    Lee et al.
(Continued)

FOREIGN PATENT DOCUMENTS

JP    2012-185501 A    9/2012
KR    20090112907 A  * 10/2009 ............... H01J 1/30
(Continued)

OTHER PUBLICATIONS

Patent Translate KR 20090112907.*
(Continued)

*Primary Examiner* — Thoi V Duong
(74) *Attorney, Agent, or Firm* — Fitch, Even, Tabin & Flannery LLP

(57) ABSTRACT

Disclosed are an electrically variable transmittance film and a method of manufacturing the same. The electrically variable transmittance film includes a base film, a first transparent electrode layer formed on the base film, a transparent non-conductive layer forming a pattern on the first transparent electrode layer, a variable transmittance layer formed on the transparent non-conductive layer, and including particles movable by an electric field, and a second transparent electrode layer formed on the variable transmittance layer.

16 Claims, 14 Drawing Sheets

(58) Field of Classification Search
CPC .... G02F 1/1343; G02F 1/13439; G02F 1/167; G02F 1/1676; G02F 1/1681
See application file for complete search history.

(56) References Cited

U.S. PATENT DOCUMENTS

2020/0050033 A1*  2/2020  Galwaduge ........... G02F 1/1685
2020/0362623 A1*  11/2020 Bae ................... G02F 1/133377

FOREIGN PATENT DOCUMENTS

| KR | 10-2010-0054031 A | 5/2010 |
| KR | 10-1612228 B1 | 4/2016 |
| KR | 10-2016-0069347 A | 6/2016 |
| KR | 10-2017-0012753 A | 2/2017 |
| KR | 10-1914527 B1 | 11/2018 |
| KR | 10-1999352 B1 | 7/2019 |
| KR | 10-2141631 B1 | 8/2020 |
| KR | 10-2176231 B1 | 11/2020 |
| KR | 10-2386479 B1 | 4/2022 |

OTHER PUBLICATIONS

KIPO; Application No. PCT/KR2022/006200; International Search Report and Written Opinion dated Jul. 26, 2022.
KIPO; Application No. 10-2021-0072969; Notice of Allowance dated Mar. 25, 2022.
KIPO; Application No. 10-2021-0072969; Notice of Non-FInal Rejection dated Jul. 28, 2021.

* cited by examiner

FILM WITH ELECTRICALLY CONTROLLABLE TRANSPARENCY AND METHOD FOR MANUFACTURING SAME

TECHNICAL FIELD

An embodiment of the disclosure relates to a film with transmittance varying according to an external electrical signal and a method of manufacturing the same.

BACKGROUND ART

An electrically variable transmittance film is a film that can control the amount of transmitted light. The variable electrical permeability film may be constructed by inserting a variable transmittance layer having liquid crystal or suspended polarized particles between two opposing transparent conductive films. When an electric field is not applied to the particles, the liquid crystal or suspended polarized particles are irregularly arranged and scatter light, lowering transmittance. When an electric field is applied thereto, the particles are arranged regularly and the transmittance of light increases.

DISCLOSURE

Technical Problem

A technical objective to be achieved by an embodiment of the disclosure is to provide an electrically variable transmittance film that exhibits high transmittance through the movement of particles and allows variable uniform transmittance even in a large area, and a method of manufacturing the same.

Technical Solution

To achieve the technical objective described above, an electrically variable transmittance film according to an embodiment of the disclosure includes a base film, a first transparent electrode layer formed on the base film, a transparent non-conductive layer forming a pattern on the first transparent electrode layer, a variable transmittance layer formed on the transparent non-conductive layer, and including particles movable by an electric field, and a second transparent electrode layer formed on the variable transmittance layer.

To achieve the technical objective described above, a method of manufacturing an electrically variable transmittance film, according to an embodiment of the disclosure, includes forming a first transparent electrode layer on a base film, forming a variable transmittance layer including one or more particles on the first transparent electrode layer, and forming a second transparent electrode layer on the variable transmittance layer.

Advantageous Effects

According to an embodiment of the disclosure, a transmittance reduction problem due to an electrode may be addressed, and uniform transmittance variation is possible even in a large area. In another embodiment, a large-sized electrically variable transmittance film may be manufactured through a printing process.

MODE FOR INVENTION

Hereinbelow, an electrically variable transmittance film according to an embodiment of the disclosure, and a method of manufacturing the same, are described in detail with reference to the accompanying drawings.

Figure 1:
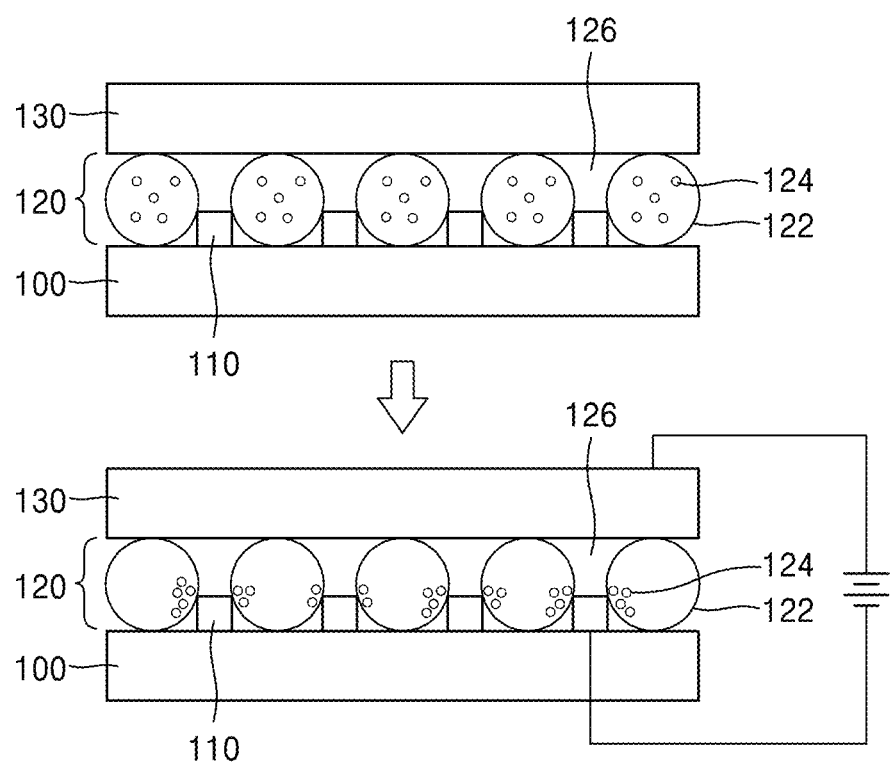
FIG. 1 illustrates an electrically variable transmittance film according to a first embodiment of the disclosure.

FIG. 1 illustrates an electrically variable transmittance film according to a first embodiment of the disclosure.

Referring to FIG. 1, the electrically variable transmittance film may include a base film 100, a first transparent electrode layer 110, a variable transmittance layer 120, and a second transparent electrode layer 130. FIG. 1 is a simple diagram of the cross-section of an electrically variable transmittance film to help understanding.

The base film 100 may be implemented by a film of a plastic material. For example, the base film may be implemented by polycarbonate (PC), polyethylene (PE), polypropylene (PP), polyvinyl alcohol (PVA), and the like. In addition, the base film 100 may be implemented by various transparent materials according to the related art that are not described in the present embodiment, and is not limited to a specific material. In another embodiment, the base film 100 may be implemented to be semi-transparent or may include a predefined color. For example, a film that transmit light and expresses a certain color may be implemented by adding a pigment to the transparent material forming the base film 100. The thickness of the base film 100 may vary according to embodiments and may be implemented to be, for example, several micrometers (μm) to several millimeters (mm).

The first transparent electrode layer 110 may include a pattern including a conductive material. The conductive material forming the first transparent electrode layer 110 may include, for example, metal, indium tin oxide (ITO), or the like. The first transparent electrode layer 110 is not limited to the term used herein and may be implemented by not only a transparent conductive material, but an opaque or semi-transparent conductive material. A width w and a distance d of a pattern forming the first transparent electrode layer 110 may be variously implemented according to embodiments, and for example, the width may be implemented to be 3-30 μm and the distance may be implemented to be 30-300 μm. The pattern thickness of the first transparent electrode layer 110 may be variously implemented according to embodiments, and for example, the pattern thickness of the first transparent electrode layer 110 may be implemented to be 500 nm-50 μm.

Figure 2:
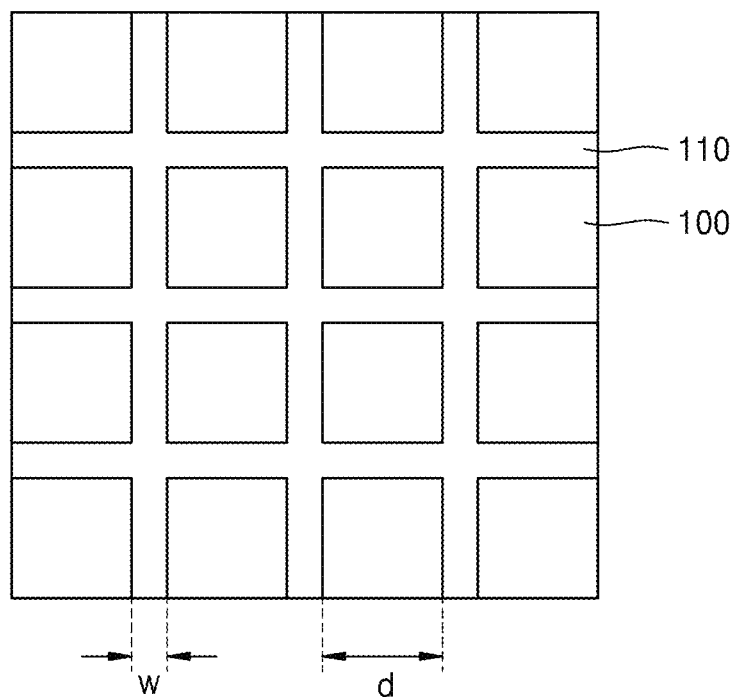
FIG. 2 illustrates an example of a pattern of a first transparent electrode layer according to an embodiment of the disclosure.

The pattern formed in the first transparent electrode layer 110 may have a regular shape or an irregular shape. For example, the conductive pattern of the first transparent electrode layer 110 may be in a quadrangular pattern as illustrated in FIG. 2 or a honeycomb-shaped pattern. As the conductive pattern of the first transparent electrode layer 110 is used to adjust the transmittance of an electrically variable transmittance film by gathering one or more particles 124 existing in the variable transmittance layer 120 into one position when an electric field is applied thereto, the conductive pattern is not necessarily to have a regular shape, and may have an irregularly arranged shape with a narrow width according to embodiments. In the following description, a case assuming that the conductive pattern of the first transparent electrode layer 110 is regular as illustrated in FIG. 2 is described.

Figure 11:
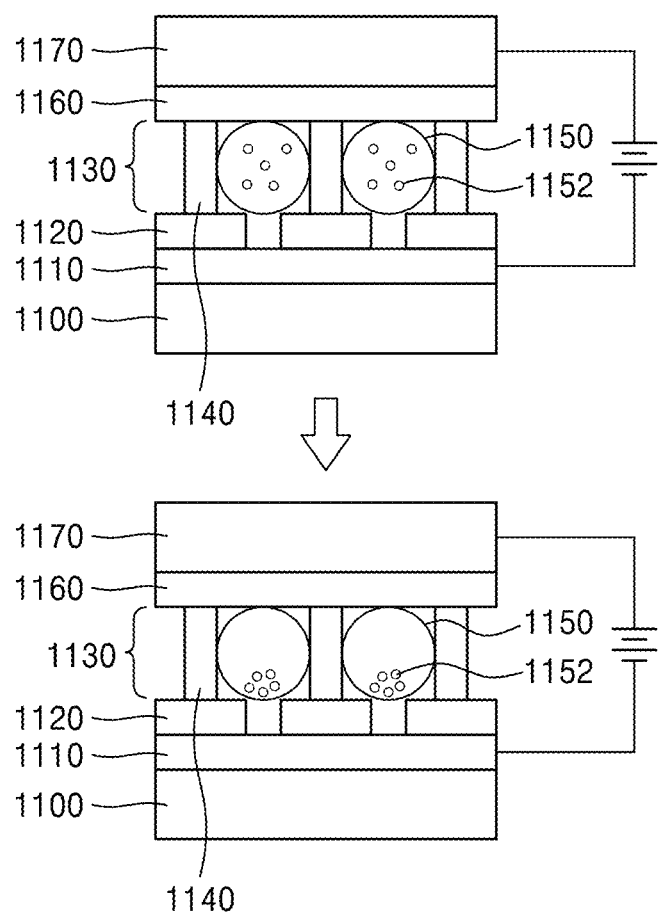
FIG. 11 illustrates an electrically variable transmittance film according to a third embodiment of the disclosure.
Figure 12:
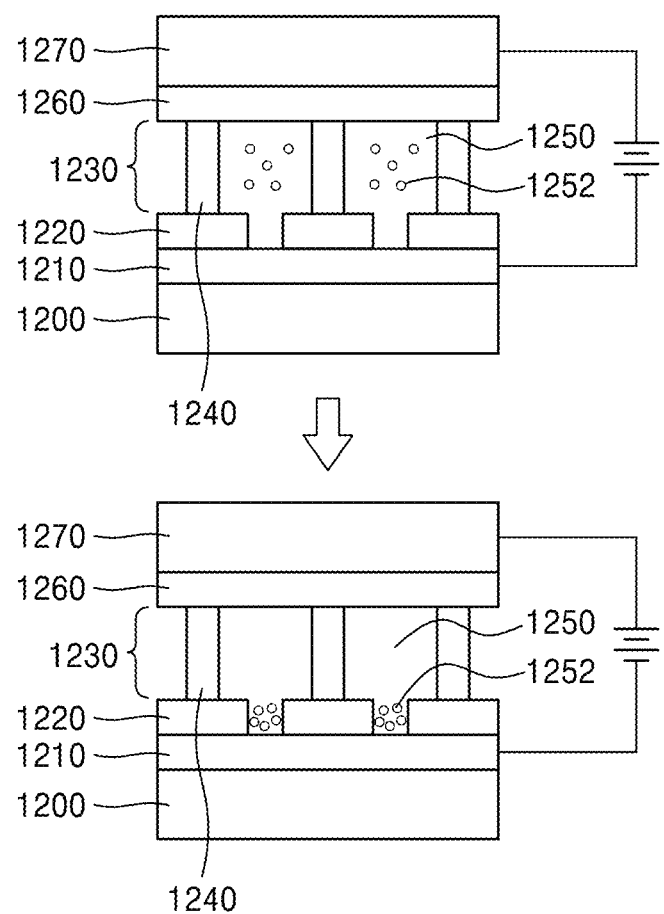
FIG. 12 illustrates an electrically variable transmittance film according to a fourth embodiment of the disclosure.
Figure 13:
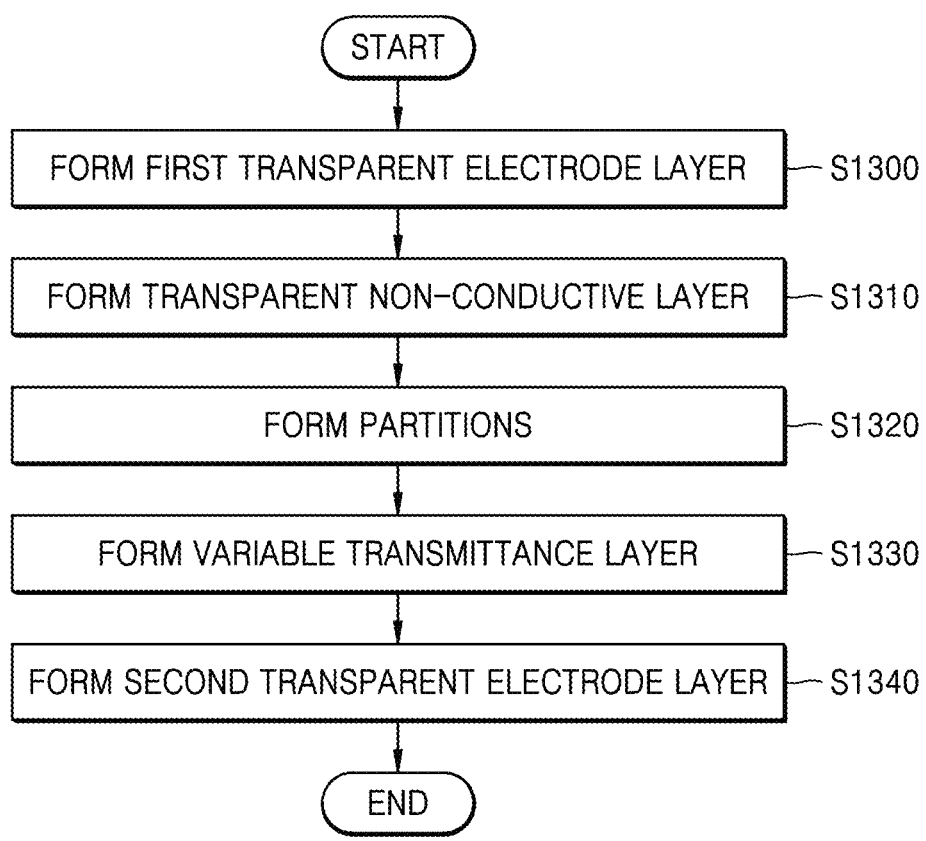
FIG. 13 illustrates a method of manufacturing the electrically variable transmittance films according to the third and fourth embodiments, according to an embodiment of the disclosure.

The variable transmittance layer 120 may include the particles 124 that are movable by an electric field. For example, the particles 124 may be particles having an electric charge (positive charge or negative charge) or a zeta electric charge. The variable transmittance layer 120 may be formed in various structures to guarantee movability of particles. For example, as in the embodiments of FIGS. 1 and 3, the particles 124 and 334 may be respectively included in a plurality of capsules 122 and 332, or the particles may be included in a space formed by partition walls, as illustrated in FIGS. 11 and 13. In addition, in order for the variable transmittance layer 120 to provide particle movability, various methods of forming a certain space may be applied to the present embodiment, and the disclosure is not limited to any one method. In the following description, to help understanding of the disclosure, in FIGS. 1 and 3, a structure including capsules is described, and in FIGS. 11 and 12, a structure including partition walls is described.

Referring back to FIG. 1, the variable transmittance layer 120 may include the capsules 122 including one or more particles. The variable transmittance layer 120 may include a binder 126 to fix the capsules 122 between the base film 100 and the second transparent electrode layer 130. Various types of the binder 126 according to the related art may be applied to the present embodiment, and the binder 126 may include a transparent, semi-transparent, or certain colored material.

Transmittance is adjusted through the movement of the particles 124 located between the first transparent electrode layer 110 and the second transparent electrode layer 130. For the movement of the particles 124, a space of a certain distance is needed between the first transparent electrode layer 110 and the second transparent electrode layer 130. To secure a space between the two electrode layers 110 and 130, a spacer such as a partition wall and the like, as illustrated in FIGS. 11 and 12, may be arranged by a certain distance between the base film 100 and the second transparent electrode layer 130. However, when a separate spacer is arranged, the structure becomes complicated, and as an additional process for forming a spacer is needed, manufacturing cost increases. Accordingly, in the present embodiment, the capsules 122 each having a certain volume is used to secure a space between the first transparent electrode layer 110 and the second transparent electrode layer 130. The capsules 122 serve as a spacer supporting the space between the first transparent electrode layer 110 and the second transparent electrode layer 130. In an embodiment, each of the capsules 122 may have a diameter of 10-100 μm, but the disclosure is not limited thereto. Also, after the second transparent electrode layer 130 and the like is coated, the capsules 122 may be pressed and formed into a disc shape. In this state, the capsule size may be set to have a height of 5-50 μm, but the disclosure is not limited thereto.

The capsules 122 exist between the base film 100 and the second transparent electrode layer 130. Although the present embodiment illustrates, for convenience of explanation, that the capsules 122, each being circular, are arranged in a row, the capsules 122 may exist irregularly between the base film 100 and the second transparent electrode layer 130 and may be arranged in multiple layers overlapping each other. Also, when a certain pressure is applied from the outside, the shape of the capsules 122 may be oval, not circular.

The capsules 122 may each include a capsule wall, the particles 124, and the like. A dispersion material (e.g., oil and the like) exists in each of the capsules 122. The dispersion material is a material that is not cured, and various materials according to the related art may be used as the dispersion material.

The particles 124 in each of the capsules 122 are particles having an electric charge affected by an electric field or a zeta electric charge according to an additive of the dispersion material. As the particles 124 are charged with the same type of an electric charge (e.g., positive charge or negative charge), unless an electric field is applied from the outside, the particles 124 are dispersed in the dispersion material in the capsules 122. The shape of each of the particles 124 may be implemented in various shapes, such as a circular shape, a rod shape, or the like, according to embodiments.

The size of each of the capsules 122 may be variously implemented according to embodiments. In an embodiment, when an electric field is applied to the capsules 122, for the particles 124 in each of the capsules 122 to be gathered well in a direction (or the opposite direction) of the conductive pattern of the first transparent electrode layer 110, the size of each of the capsules 122 may be implemented to be greater than or equal to the distance d between lines forming the pattern of the first transparent electrode layer 110. For example, when the distance d between the lines of the conductive pattern is 50 μm, the size of each of the capsules 122 may be implemented to be 50 μm or more. In another embodiment, the size of each of the capsules 122 may be implemented to be less than the distance d between the lines of the pattern.

The second transparent electrode layer 130 may include a conductive material and arranged above the variable transmittance layer 120. The second transparent electrode layer 130 may include a transparent conductive material (e.g., ITO and the like). The conductive materials forming the first transparent electrode layer 110 and the second transparent electrode layer 130 may be the same as or different from each other according to embodiments.

In another embodiment, the materials for forming the base film 100, the first transparent electrode layer 110, the variable transmittance layer 120, the second transparent electrode layer 130, and the like may be selected such that a refractive index difference therebetween is minimized. For example, the first transparent electrode layer 110 and the second transparent electrode layer 130 may be implemented by ITO, and the base film 100 may be implemented by a material that minimizes a refractive index difference from ITO among various available materials. The minimization of the refractive index difference may minimize reflection and haze at an interface.

FIG. 2 illustrates an example of a pattern of the first transparent electrode layer according to an embodiment of the disclosure.

Referring to FIG. 2, the first transparent electrode layer 110 may include a pattern of a conductive material. The distance d between the lines forming the pattern, the width w of the line, and the like may be implemented through various changes according to embodiments. A pattern of a metal material is formed on the base film 100 by a printing process (e.g., gravure printing, flexo printing, and the like) or a stamping and imprinting method, and thus, the first transparent electrode layer 110 may be formed. In this case, however, there may be shortcomings of transmittance reduction due to the metal material, resistivity reduction in a large area due to a pattern width limit, and a limit in identical driving over the entire area. As a method to address the above shortcomings, after printing (application) or coating ITO on the entire surface of the base film 100, the first transparent electrode layer 110 of the conductive pattern may be formed through etching. The method of manufacturing an electrically variable transmittance film of FIG. 1 is described again with reference to FIG. 7.

Figure 3:
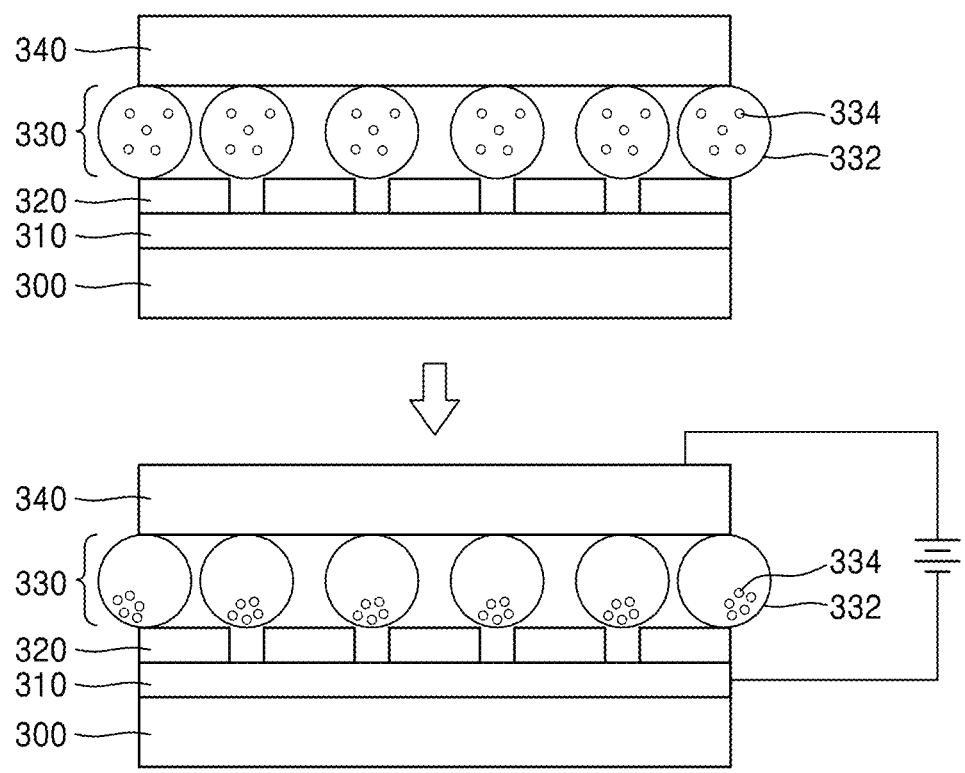
FIG. 3 illustrates an electrically variable transmittance film according to a second embodiment of the disclosure.

FIG. 3 illustrates an electrically variable transmittance film according to a second embodiment of the disclosure.

Referring to FIG. 3, the electrically variable transmittance film may include a base film 300, a first transparent electrode layer 310, a transparent non-conductive layer 320, a variable transmittance layer 330, and a second transparent electrode layer 340.

As the base film 300 and the second transparent electrode layer 340 are the same as those of the first embodiment of FIG. 1, descriptions thereof are omitted.

The first transparent electrode layer 310 is formed on the entire surface of the base film 300. The first transparent electrode layer 310 may include a transparent conductive material (e.g., ITO). For example, the first transparent electrode layer 310 may be formed by coating or applying a transparent conductive material to the base film 300, or adhering a transparent conductive film (e.g., an ITO film) to the base film 300. In addition, various methods according to the related art may be applied to the present embodiment.

The transparent non-conductive layer 320 may include a pattern formed of a non-conductive material on the first transparent electrode layer 310. The thickness of the transparent non-conductive layer 320 may be variously implemented according to embodiments, and for example, the transparent non-conductive layer 320 has a thickness of 0.1-20 µm. The transparent non-conductive layer 320 is not limited to the term used herein, and the non-conductive material may be implemented by a transparent or semi-transparent material. For example, polymer, acryl, urethane, and the like may be used as the non-conductive material. In addition, various transparent or semi-transparent materials according to the related art, which are not described in the present embodiment, may be used as the non-conductive material forming the transparent non-conductive layer 320 and are not limited to a specific type.

Figure 4:
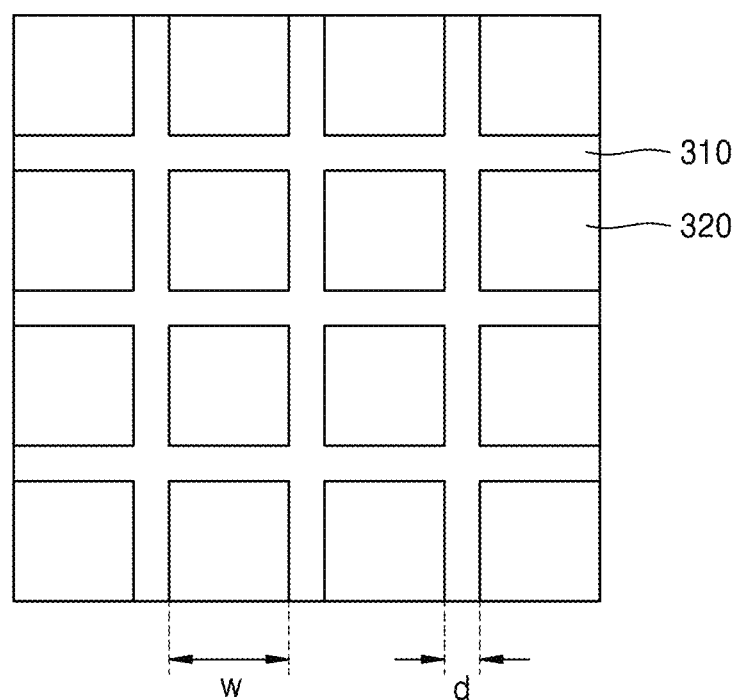
FIGS. 4 and 5 illustrate an example of a pattern of a transparent non-conductive layer according to an embodiment of the disclosure.
Figure 5:
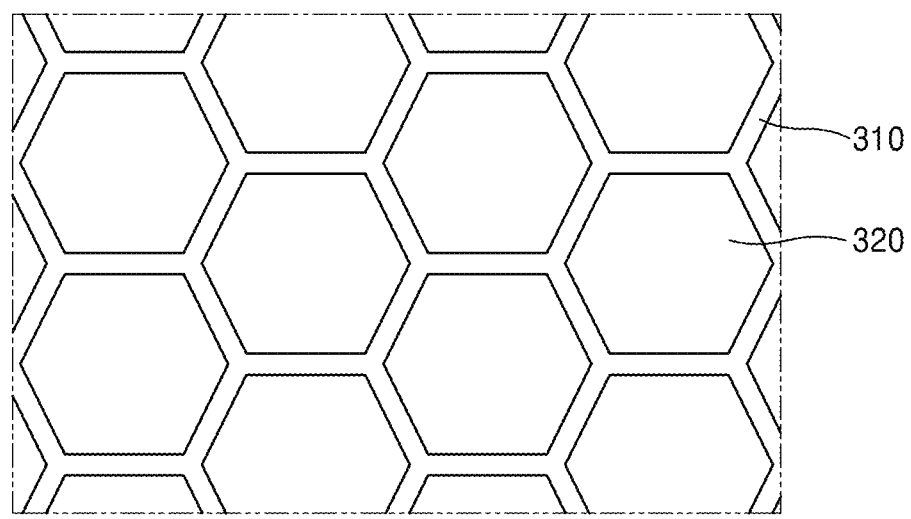

While the conductive pattern of FIG. 1 is an embossed form, a conductive pattern by the transparent non-conductive layer 320 of FIG. 3 is an engraved form. The non-conductive pattern may be in a quadrangular shape as illustrated in FIG. 4 or a honeycomb shape as illustrated in FIG. 5. In addition, the non-conductive pattern may have various shapes according to embodiments.

When electricity is applied to the first transparent electrode layer 310 and the second transparent electrode layer 340, the strength of an electric field formed between the first transparent electrode layer 310 and the second transparent electrode layer 340 varies depending on the pattern shape of the transparent non-conductive layer 320. For example, the strength of an electric field in a portion where a non-conductor exists and the strength of an electric field in a conductive pattern portion where a non-conductor does not exist are different from each other.

The variable transmittance layer 330 may include one or more particles 334 that are charged. In an embodiment, the particles 334 may exist in each of the capsules 332. In other words, the variable transmittance layer 330 may include the capsules 332, each including the particles 334, and a binder 336. When an electric field is applied, the particles 334 are gathered close to the first transparent electrode layer 310 exposed between the non-conductive patterns, and thus, transmittance is increased. When the electric field is removed, the particles 334 are moves away from each other by a repulsive force and distributed between the transparent non-conductive layer 320 and the second transparent electrode layer 340, thereby lowering transmittance. The capsules 332 may serve as a spacer forming a certain distance between the transparent non-conductive layer 320 and the second transparent electrode layer 340. As the capsules 332 and the like forming the variable transmittance layer 330 are the same as those of the first embodiment of FIG. 1, an additional description thereof is omitted.

The size of each of the capsules 332 may be variously implemented according to embodiments. In an embodiment, when an electric field is applied, in order for the particles 334 in the capsules 332 to be gathered well in one position, the size of each of the capsules 332 may be implemented to be the width w or more of the non-conductor of the non-conductive pattern. For example, when the width w of the non-conductor of the non-conductive pattern is 50 µm, the size of each of the capsules 332 may be implemented to be 50 µm or more. In another embodiment, the size of each of the capsules 332 may be implemented to be less than the width w of the non-conductor. When an electric field is applied, the particles 334 in each of the capsules 332 are moved from the non-conductive pattern to an etching portion (or an opposite direction) where the first transparent electrode layer 310 is exposed, and when the electric field is removed, the particles 334 in each of the capsules 332 are distributed by a repulsive force and dispersed in the capsules 332. Transmittance varies according to the movement of the particles 334 in the capsules 332.

In another embodiment, the materials for forming the base film 300, the first transparent electrode layer 310, the transparent non-conductive layer 320, the variable transmittance layer 330, the second transparent electrode layer 340, and the like may be selected such that a refractive index difference therebetween is minimized. For example, the first transparent electrode layer 310 and the second transparent electrode layer 340 maybe implemented by ITO, and the transparent non-conductive layer 320 may be implemented by a material that minimizes a refractive index difference from ITO among various available materials The minimization of the refractive index difference may minimize reflection and haze at an interface.

FIGS. 4 and 5 illustrate an example of a pattern of a transparent non-conductive layer according to an embodiment of the disclosure.

Referring to FIGS. 4 and 5, the pattern of the transparent non-conductive layer 320 may have a quadrangular shape or a honeycomb shape. The width w of the non-conductor forming the non-conductive pattern, the distance d (e.g., 3-15 µm) between the non-conductors, and the like may be implemented through various changes according to embodiments. The distance (i.e., an engraved pattern) between the non-conductors may serve as an electrode.

Figure 6:
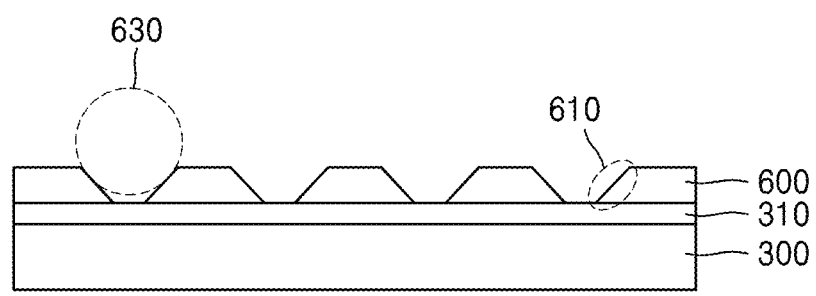
FIG. 6 illustrates another example of a pattern of a transparent non-conductive layer according to an embodiment of the disclosure.

FIG. 6 illustrates another example of a pattern of a transparent non-conductive layer according to an embodiment of the disclosure.

Referring to FIG. 6, a boundary 610 of a non-conductive pattern of a transparent non-conductive layer 600 may be implemented by an inclined surface. When each boundary 610 of the non-conductor forming the non-conductive pattern includes an inclined surface, a capsule 630 may be located closer to the first transparent electrode layer 310, and thus, when an electric field is applied, particles in the capsule 630 may be gathered well in one position. In other words, by enlarging a direct/indirect contact surface between the capsule 630 and the first transparent electrode layer 310, the strength of an electric field applied to the capsule 630 is increased so that the particles may be quickly moved.

Figure 7:
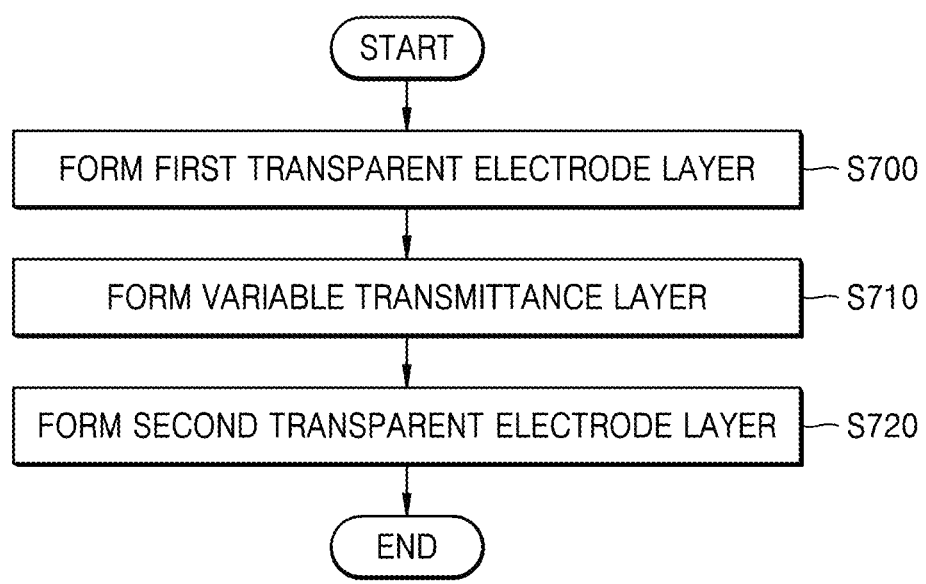
FIGS. 7 and 8 illustrate a method of manufacturing the electrically variable transmittance film according to the first embodiment, according to an embodiment of the disclosure.
Figure 8:
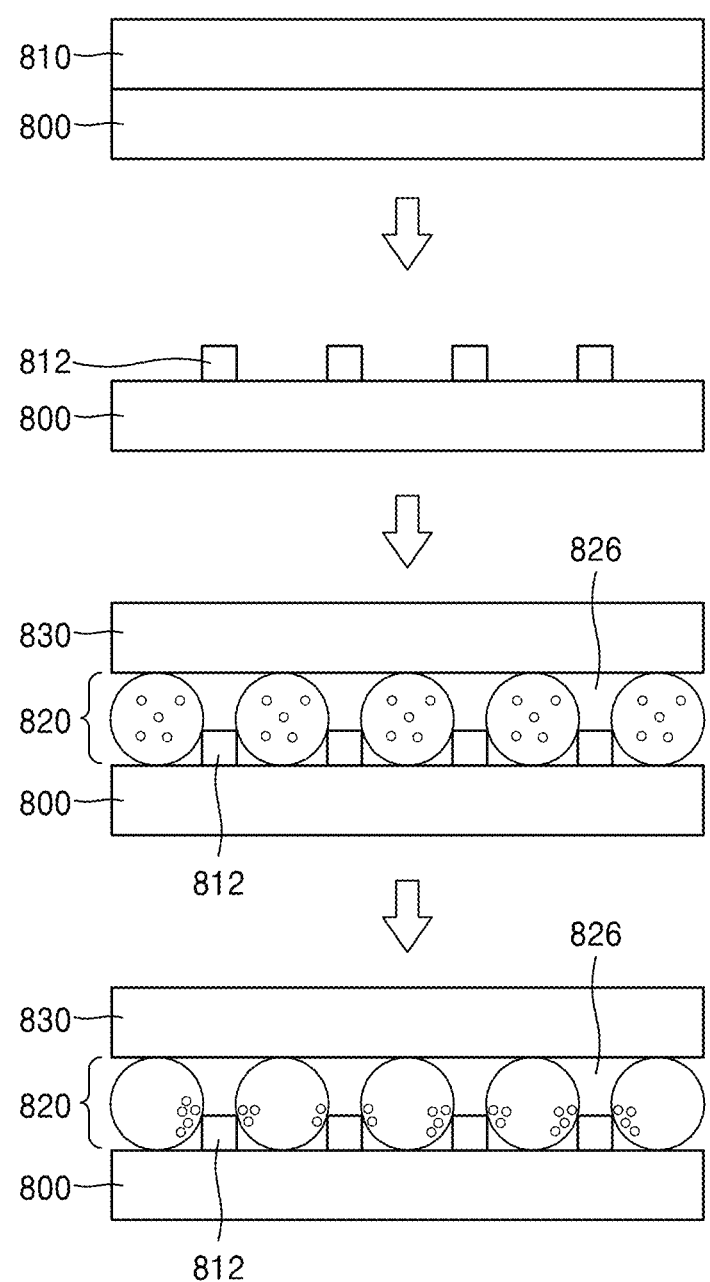

FIGS. 7 and 8 illustrate a method of manufacturing the electrically variable transmittance film according to the first embodiment, according to an embodiment of the disclosure.

Referring to FIGS. 7 and 8 together, a first transparent electrode layer 812 having a certain pattern is formed on a baser film 800 (S700). For example, a transparent electrode material (e.g., ITO) 810 is printed or coated on the entire surface of the base film 800 and then etched into a certain shape, thereby forming the first transparent electrode layer 812 including a conductive pattern.

A variable transmittance layer 820 is formed on the first transparent electrode layer 812 (S710). The variable transmittance layer 820 may include capsules and a binder. A solvent in which a polymer forming a capsule wall along with charged particles is molten is mixed by a method such as agitation, vibration, or voltage application, thereby manufacturing a capsule including one or more particles. In addition, various capsule manufacturing methods according to the related art may be applied to the present embodiment. In another embodiment, the capsule may be already manufactured by various methods according to the related art. The variable transmittance layer 820 may be formed on the first transparent electrode layer 812 by a printing method, a coating method, or the like.

A second transparent electrode layer 830 is formed on the variable transmittance layer 820 (S720). A film of a certain thickness including a transparent conductive material is disposed on the variable transmittance layer 820 to form the second transparent electrode layer 830, or the second transparent electrode layer 830 may be formed by coating or printing a conductive material on the variable transmittance layer 820. In addition, various methods according to the related art may be applied to the formation of the second transparent electrode layer 830. As an example, the second transparent electrode layer 830 may be formed by attaching an ITO film to the variable transmittance layer 820. An optical transparent adhesive OCA and the like may be used for the attachment of the ITO film. In addition, various methods of attaching an ITO film according to the related art may be applied to the present embodiment.

Figure 9:
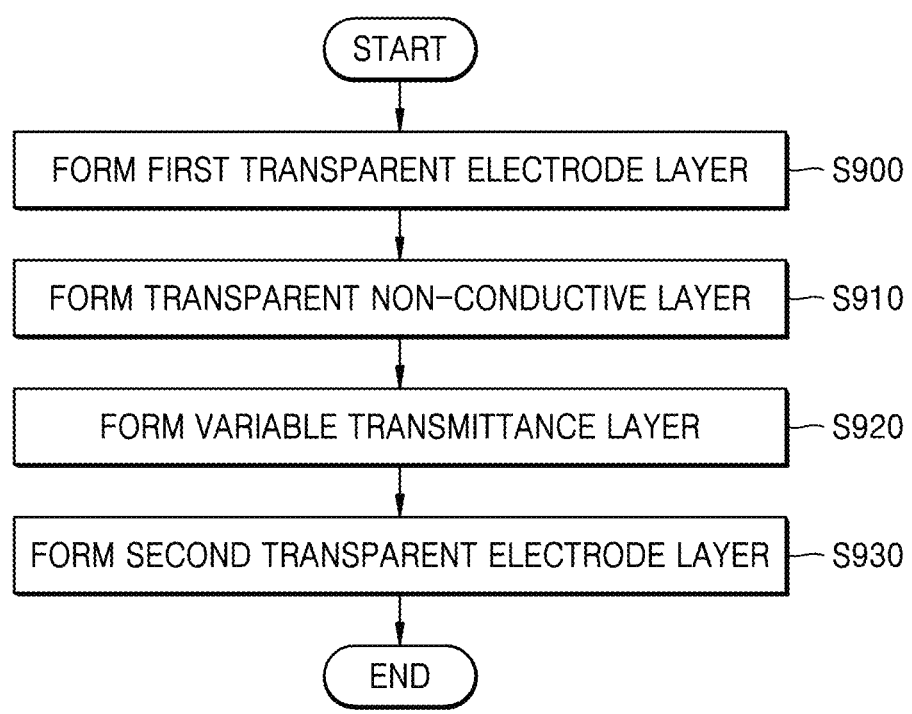
FIGS. 9 and 10 illustrate a method of manufacturing the electrically variable transmittance film according to the second embodiment, according to an embodiment of the disclosure.
Figure 10:
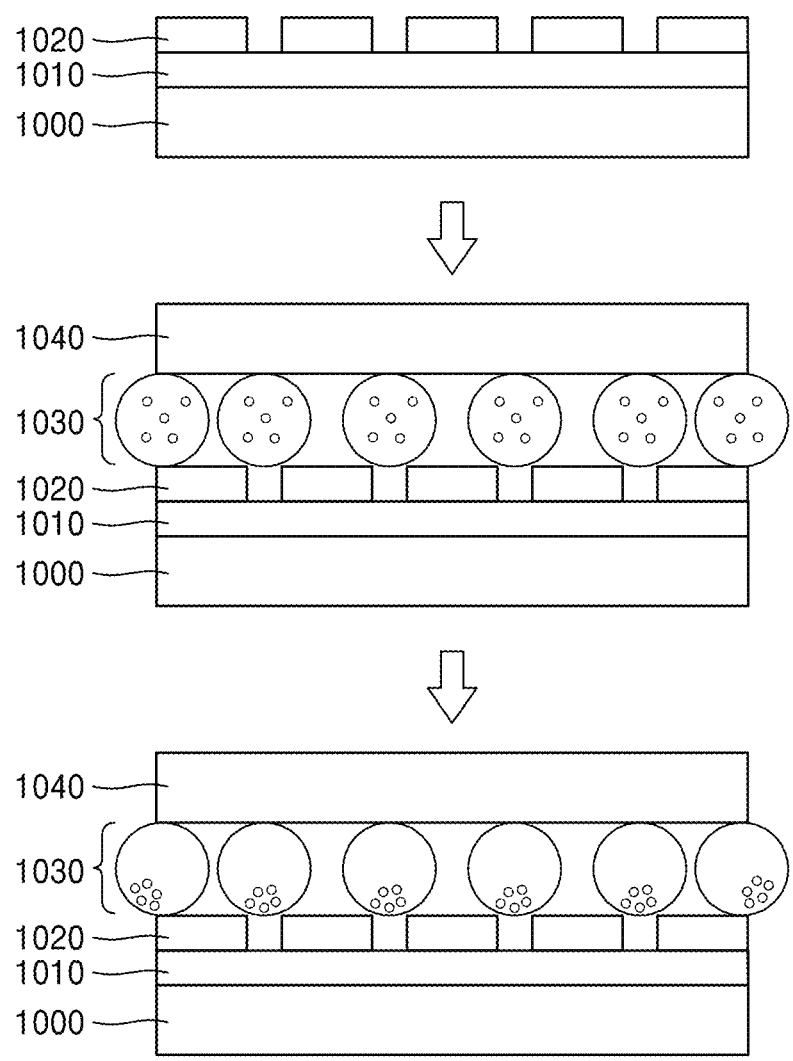

FIGS. 9 and 10 illustrate a method of manufacturing the electrically variable transmittance film according to the second embodiment, according to an embodiment of the disclosure.

Referring to FIGS. 9 and 10 together, a first transparent electrode layer 1010 is formed on a base film 1000 (S900). The first transparent electrode layer 1010 is formed on the entire surface of the base film 1000. For example, the first transparent electrode layer 1010 may be formed on the base film 1000 by applying various methods according to the related art, such as printing, coating, attaching, and the like.

When the first transparent electrode layer 1010 is formed, a transparent non-conductive layer 1020 is formed thereon (S910). The transparent non-conductive layer 1020 may include a non-conductive material of a certain pattern. For example, the transparent non-conductive layer 1020 having a certain pattern may be formed by forming a non-conductive material on the first transparent electrode layer 1010 in a pattern as illustrated in FIGS. 4 to 5 by a printing method or a stamping and imprinting method.

In an embodiment, when a non-conductive pattern is formed by an imprinting method, pressure is applied by using a roller with an embossed printing pattern to form the non-conductive pattern, and thus, a non-conductive material having a height less than the height of a non-conductive material of the non-conductive pattern may exist in a conductive pattern by the transparent non-conductive layer 1020. Although, in the embodiments of FIGS. 3 to 5, the first transparent electrode layer 310 is exposed, as it is, in the conductive pattern portion formed by the non-conductive layer, in another embodiment, the embodiments of FIGS. 3 to 5 may be implemented in the form in which a non-conductive material having a height less than the height of the non-conductive layer 1020 exists in the conductive pattern portion.

When the transparent non-conductive layer 1020 is formed, a variable transmittance layer 1030 is formed thereon (S920). The variable transmittance layer 1030 may include capsules and a binder. The variable transmittance layer 1030 may be formed by the same method as the variable transmittance layer forming method of FIG. 8.

When the variable transmittance layer 1030 is formed, a second transparent electrode layer 1040 is formed thereon (S930). The second transparent electrode layer 1040 may be formed by the same method as the second transparent electrode layer forming method of FIG. 8.

In another embodiment, before forming the variable transmittance layer 1030, a process of etching a pattern boundary of the transparent non-conductive layer 1020 into an inclined surface may be further provided.

FIG. 11 illustrates an electrically variable transmittance film according to a third embodiment of the disclosure.

Referring to FIG. 11, the electrically variable transmittance film may include a base film 1100, a first transparent electrode layer 1110, a transparent non-conductive layer 1120, a variable transmittance layer 1130, and a second transparent electrode layer 1170.

As the base film 1100, the first transparent electrode layer 1110, the transparent non-conductive layer 1120, and the second transparent electrode layer 1170 are the same as those of the second embodiment of FIG. 3, descriptions thereof are omitted.

The variable transmittance layer 1130 may include partition walls 1140 and capsules 1150. Although, in the first embodiment of FIG. 1 and the second embodiment of FIG. 3, a spacer such as a partition wall and the like does not exist and the capsules serve as a spacer, in contrast, in the present embodiment, the partition walls 1140 are provided to better withstand external pressure. The partition walls 1140 may include the same material as or a different material from the non-conductive material of the transparent non-conductive layer 1120. In another embodiment, the partition walls 1140 may be added to the first embodiment of FIG. 1.

The partition walls 1140 may be arranged on the transparent non-conductive layer 1120 at regular intervals or irregularly. For example, the partition walls 1140 may be arranged in the same pattern (e.g., a quadrangular pattern or a honeycomb-shaped pattern) as the pattern of the transparent non-conductive layer 1120 with a width less than the width of the transparent non-conductor. The arrangement form, height, width, and the like of the partition walls 1140 may be variously changed according to embodiments. For example, each of the partition walls 1140 may be implemented to have a width of 5-30 μm and a height of 20-100 μm, and a distance between the partition walls 1140 may be implemented to be 20-100 μm. In another embodiment, the partition walls 1140 may be implemented in the form of having an inclined surface of 1-10° for stability, that is, the thickness of each partition wall increases downward from top to bottom.

The capsules 1150 including one or more particles 1152 that are movable by an electric field exist in a space partitioned by the partition walls 1140. In an embodiment, the arrangement distance of the partition walls 1140 or the size of each of the capsules 1150 may be determined to include one capsule in each space partitioned by the partition walls 1140. For example, one capsule 1150 may exist between the partition walls 1140 by implementing the partition walls 1140 such that the distance between the partition walls 1140 is greater than the diameter of one capsule and also less than the diameter of two capsules. When one capsule 1150 exists in each space partitioned by the partition walls 1140, the particles 1152 in each of the capsules 1150 may be gathered well in one position by the conductive pattern that is engraved. In another embodiment, the arrangement distance of the partition walls 1140 or the size of each of the capsules 1150 may be determined such that the capsules 1150 exist in the space partitioned by the partition walls 1140. In another embodiment, to fix the capsules 1150, a binder as in the embodiments of FIGS. 1 and 3 may be further included between the capsules 1150.

An adhesive layer 1160 for attaching the second transparent electrode layer 1170 may be further provided between the second transparent electrode layer 1170 and the variable transmittance layer 1130. The configuration of the adhesive layer 1160 may also be added to the embodiments of FIGS. 1 and 3. The adhesive layer 1160 may include an optical transparent adhesive (OCA). In addition, various transparent adhesives according to the related art may be applied to the present embodiment.

FIG. 12 illustrates an electrically variable transmittance film according to a fourth embodiment of the disclosure.

Referring to FIG. 12, the electrically variable transmittance film may include a base film 1200, a first transparent electrode layer 1210, a transparent non-conductive layer 1220, a variable transmittance layer 1230, and a second transparent electrode layer 1270. The base film 1200, the first transparent electrode layer 1210, the transparent non-conductive layer 1220, and the second transparent electrode layer 1270 may be configured as those described in the third embodiment of FIG. 11.

The variable transmittance layer 1230 may include ink 1250, in which one or more particles 1252 are dispersed, and partition walls 1240. The partition walls 1240 are used to form a certain space between the transparent non-conductive layer 1220 and the second transparent electrode layer 1270, and is the same as that described in the third embodiment of FIG. 11. The ink 1250 including the particles 1252 that are movable by an electric field is injected between the partition walls 1240. The ink 1250 is not limited to the term used herein, and may include various materials (e.g., oil and the like) that are not cured and have a certain viscosity so that particles may move. Furthermore, the ink 1250 may include a transparent or semi-transparent material or a material having a color.

An adhesive layer 1260 for attaching the second transparent electrode layer 1270 may be further provided between the second transparent electrode layer 1270 and the variable transmittance layer 1230. The adhesive layer 1260 may include various transparent adhesives according to the related art, such as an optical transparent adhesive (OCA), and the like.

FIG. 13 illustrates a method of manufacturing the electrically variable transmittance films according to the third and fourth embodiments, according to an embodiment of the disclosure.

Referring to FIG. 13, the first transparent electrode layers 1110 and 1210 are respectively formed on the base films 1100 and 1200 (S1300). The first transparent electrode layers 1110 and 1210 are respectively formed on the entire surfaces of the base films 1100 and 1200. For example, the first transparent electrode layers 1110 and 1210 may be respectively formed on the base films 1100 and 1200, by using various methods according to the related art, such as printing, coating, or the like.

When the first transparent electrode layers 1110 and 1210 are formed, the transparent non-conductive layers 1120 and 1220 are respectively formed thereon (S1310). The transparent non-conductive layers 1120 and 1220 may each include a non-conductive material in a certain pattern, as illustrated in FIGS. 4 and 5. For example, a non-conductive material is formed on each of the first transparent electrode layers 1110 and 1210 in the certain pattern as illustrated in FIG. 4 or 5 by a printing method or a stamping and imprinting method, thereby forming the transparent non-conductive layers 1120 and 1220.

In an embodiment, when an imprinting method is used, after coating or coating a non-conductive material on each of the first transparent electrode layers 1110 and 1210, pressure is applied to the non-conductive material by using a roller having an embossed printing pattern, and thus, a transparent non-conductive layer having a certain pattern may be formed. For example, to form the non-conductive pattern of FIG. 4 or 5, the pattern may be generated by applying pressure to the non-conductive material by using a roller having a printing pattern (i.e., a pattern having an embossed conductive pattern formed by a non-conductive pattern) corresponding to the pattern of FIG. 4 or 5.

Figure 14:
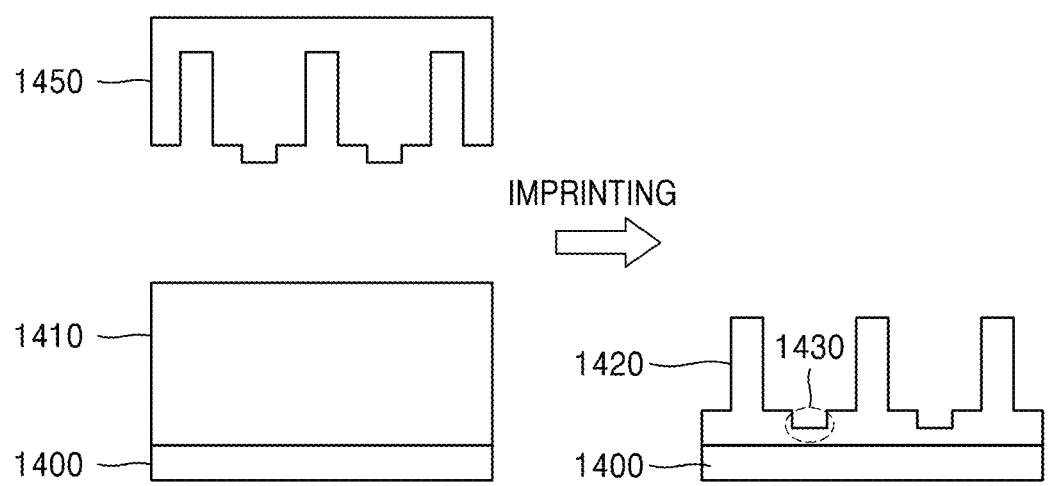
FIG. 14 illustrates a method of generating partition walls and a non-conductive pattern through one-time imprinting, according to an embodiment of the disclosure.

In another embodiment, the non-conductive pattern and the partition walls may be formed together through one-time imprinting. For example, a non-conductive material having a height greater than or equal to the height of the partition walls 1140 and 1240 is coated on or applied to the first transparent electrode layers 1110 and 1210. As illustrated in FIG. 14, by applying pressure to the non-conductive material using a roller having an embossed printing pattern corresponding to the partition wall and the non-conductive pattern, the partition walls 1140 and 1240 and the non-conductive pattern may be simultaneously generated. Although FIGS. 11 and 12 illustrate that the first transparent electrode layers 1110 and 1210 are exposed, as they are, in the conductive pattern area formed by the non-conductive pattern, in another embodiment, the embodiments of FIGS. 11 and 12 may each be implemented in the form in which a non-conductive material having a height less than the height of the non-conductive layer exists in the conductive pattern area.

When the transparent non-conductive layers 1120 and 1220 are formed, the partition walls 1140 and 1240 are respectively formed thereon (S1320). For example, as illustrated in FIGS. 12 and 13, partition walls each having a certain height and width are formed.

When the partition walls 1140 and 1240 are formed, the variable transmittance layers 1130 and 1230 including particles that are movable by an electric field is formed between the partition walls 1140 and 1240 (S1330). For example, as illustrated in FIG. 11, the variable transmittance layer 1130 may be formed by filling the capsules 1150, each including the particles 1152, between the partition walls 1140, or as illustrated in FIG. 12, the variable transmittance layer 1230 may be formed by injecting the ink 1250 including the particles 1252 between the partition walls 1240.

When the variable transmittance layers 1130 and 1230 are formed, the second transparent electrode layers 1170 and 1270 are formed thereon (S1340). The second transparent electrode layers 1170 and 1270 may be formed by the same method as the second transparent electrode layer forming method of FIG. 8. In an embodiment, the adhesive layers 1160 and 1260 for attaching a transparent electrode film (ITO film) for forming the second transparent electrode layers 1170 and 1270 respectively to the variable transmittance layers 1130 and 1230 may be further provided.

FIG. 14 illustrates an example of a method of generating partition walls and a non-conductive pattern through one-time imprinting according to an embodiment of the disclosure.

Referring to FIG. 14, a printing pattern 1450 may have various shapes according to the pattern of the transparent non-conductive layer and the pattern of partition walls 1420. For example, when the electrically variable transmittance film as illustrated in FIG. 12 or 13 is manufactured, pressure is applied to a non-conductive material 1410 having a certain height and disposed on a base film 1400 by using a roller having the printing pattern 1450 that is embossed, and thus, the partition walls 1420 and the non-conductive pattern (i.e., an engraved conductive pattern) may be simultaneously formed.

A non-conductive material having a certain height may exist on a conductive pattern 1430 (hereinafter, referred to as the engraved pattern) that is engraved by the non-conductive pattern. For example, a non-conductive material having a certain thickness less than the thickness of a surrounding area may remain in the engraved pattern 1430 of the transparent non-conductive layer of FIGS. 11 and 12. When the partition walls 1420 and the engraved pattern 1430 are simultaneously formed by the pressure of a roller as in the method of FIG. 14, the non-conductive material may remain on the engraved pattern 1430.

The electric field applied to the particles may be affected by the non-conductive material remaining on the engraved pattern. For example, when the resistance of the non-conductive material forming the transparent non-conductive layer is large, the electric field is not transferred to the particles through the engraved pattern, and when the resistance of the non-conductive material is too low, during voltage driving, the electric field is applied to the entire transparent non-conductive layer so that the particles are not gathered well in an engraved pattern portion.

In order for the electric field to be applied to the particles through the engraved pattern only, the surface resistance of the transparent non-conductive layer, the thickness of the non-conductive material remaining on the engraved pattern, the depth of the engraved pattern, and the like are considered. In other words, by adjusting at least one of the electrical resistance of the non-conductive material for forming the transparent non-conductive layer, the depth of the engraved pattern, and the thickness of the non-conductive material remaining on the engraved pattern, only the engraved pattern may operate as a conductive pattern for voltage driving.

In an embodiment, the non-conductive material of the transparent non-conductive layer may include a material having an electrical resistance of $10^{-7}$ to $10^{-13}\Omega$. In addition, the non-conductive material having electrical resistance in an appropriate range according to the thickness of the engraved pattern may be selected therefor.

In another embodiment, the thickness of the non-conductive material remaining on the engraved pattern of the transparent non-conductive layer may be set to be 50 nm to 10 μm. In particular, the thickness of the engraved pattern may be set to be 100 nm to 5 μm.

In another embodiment, the depth of the engraved pattern of the transparent non-conductive layer may be set to be 3-30 μm. In particular, the depth of the engraved pattern may be set to be 5-20 μm.

While this disclosure has been particularly shown and described with reference to preferred embodiments thereof, it will be understood by those of ordinary skill in the art that various changes in form and details may be made therein without departing from the spirit and scope of the disclosure as defined by the appended claims. The preferred embodiments should be considered in descriptive sense only and not for purposes of limitation. Therefore, the scope of the disclosure is defined not by the detailed description of the disclosure but by the appended claims, and all differences within the scope will be construed as being included in the disclosure.

The invention claimed is:

1. An electrically variable transmittance film comprising:
   a base film;
   a first transparent electrode layer formed on an entire surface of the base film;
   a transparent non-conductive layer forming a pattern on the first transparent electrode layer;
   a variable transmittance layer formed on the transparent non-conductive layer, and including particles movable by an electric field; and
   a second transparent electrode layer formed on the variable transmittance layer,
   wherein the transparent non-conductive layer includes an engraved pattern, and the engraved pattern serves as an electrode.

2. The electrically variable transmittance film of claim 1, wherein the transparent non-conductive layer includes the engraved pattern including a non-conductive material, and
   the variable transmittance layer includes particles movable by an electric field in a certain space formed by partition walls.

3. The electrically variable transmittance film of claim 2, wherein the engraved pattern of the transparent non-conductive layer includes the non-conductive material with a certain thickness less than a surrounding area.

4. The electrically variable transmittance film of claim 3, wherein the transparent non-conductive layer includes a material having an electrical resistance of $10^{-7}$ to $10^{-13}\Omega$.

5. He electrically variable transmittance film of claim 3, wherein a thickness of the non-conductive material of the engraved pattern of the transparent non-conductive layer is 50 nm to 10 μm.

6. The electrically variable transmittance film of claim 3, wherein a depth of the engraved pattern of the transparent non-conductive layer is 3-30 μm.

7. The electrically variable transmittance film of claim 2, wherein the partition walls each have an inclined surface.

8. The electrically variable transmittance film of claim 1, wherein the transparent non-conductive layer has a quadrangular pattern or hexagonal pattern.

9. The electrically variable transmittance film of claim 1, wherein the pattern of the transparent non-conductive layer is formed of a transparent non-conductive material with a certain height having an inclined boundary.

10. The electrically variable transmittance film of claim 1, wherein the variable transmittance layer comprises:
   a plurality of capsules, each including one or more charged particles; and a binder for fixing the plurality of capsules.

11. The electrically variable transmittance film of claim 1, wherein the variable transmittance layer comprises ink including one or more particles that are movable by an electric field.

12. A method of manufacturing an electrically variable transmittance film, the method comprising:
   forming a first transparent electrode layer on an entire surface of a base film;
   forming a transparent non-conductive layer including partition walls and an engraved pattern, wherein the engraved pattern serves as an electrode;
   forming a variable transmittance layer including one or more particles, on the transparent non-conductive layer; and
   forming a second transparent electrode layer on the variable transmittance layer.

13. The method of claim 12, wherein the forming of the transparent non-conductive layer comprises:
   coating a non-conductive material having a certain thickness on the first transparent electrode layer; and
   applying pressure to the non-conductive material by using a roller having an embossed printing pattern corresponding to the partition walls and the engraved pattern.

14. The method of claim 13, wherein the applying of the pressure comprises generating the partition walls and the engraved pattern simultaneously on the non-conductive material through one-time imprinting by using the roller.

15. The method of claim 12, wherein the forming of the transparent non-conductive layer comprises forming a boundary of the engraved pattern of the transparent non-conductive layer, as an inclined surface.

16. The method of claim 12, wherein the forming of the variable transmittance layer comprises coating a material on the transparent non-conductive layer, wherein the material is a mixture of capsules and a binder and each of the capsules includes one or more particles movable by an electric field.

* * * * *